(12) United States Patent
Chen et al.

(10) Patent No.: US 8,134,537 B2
(45) Date of Patent: Mar. 13, 2012

(54) TOUCH DISPLAY PANEL

(75) Inventors: Zeng-De Chen, Yunlin County (TW);
Tsung-Chin Cheng, Kaohsiung (TW);
Weng-Bing Chou, Taipei County (TW);
Seok-Lyul Lee, Hsinchu (TW);
Wei-Ming Huang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 645 days.

(21) Appl. No.: 12/345,677

(22) Filed: Dec. 30, 2008

(65) Prior Publication Data
US 2010/0110022 A1 May 6, 2010

(30) Foreign Application Priority Data

Oct. 31, 2008 (TW) .............................. 97142206 A

(51) Int. Cl.
*G06F 3/041* (2006.01)
(52) U.S. Cl. ...................................................... 345/173
(58) Field of Classification Search .................. None
See application file for complete search history.

(56) References Cited

U.S. PATENT DOCUMENTS

| | | | |
|---|---|---|---|
| 6,067,144 A | 5/2000 | Murouchi | |
| 6,501,529 B1 * | 12/2002 | Kurihara et al. | 349/160 |
| 2002/0089492 A1 * | 7/2002 | Ahn et al. | 345/173 |
| 2002/0180711 A1 * | 12/2002 | Umemoto et al. | 345/173 |
| 2003/0067449 A1 * | 4/2003 | Yoshikawa et al. | 345/173 |
| 2003/0122801 A1 * | 7/2003 | Yu | 345/173 |
| 2005/0219230 A1 * | 10/2005 | Nakayama et al. | 345/173 |
| 2007/0085838 A1 * | 4/2007 | Ricks et al. | 345/173 |
| 2007/0262967 A1 | 11/2007 | Rho | |
| 2010/0110022 A1 * | 5/2010 | Chen et al. | 345/173 |

FOREIGN PATENT DOCUMENTS

| | | |
|---|---|---|
| CN | 101109859 | 1/2008 |
| JP | 2007047773 | 2/2007 |

* cited by examiner

*Primary Examiner* — Peter Vincent Agustin
(74) *Attorney, Agent, or Firm* — Jianq Chyun IP Office

(57) ABSTRACT

A touch display panel including a first substrate, a second substrate and a liquid crystal layer is provided. The first substrate includes sensing areas and a non-sensing area outside the sensing areas. Each sensing area is provided with a first electrode thereon. The second substrate includes main spacers, sensing protrusions, first sub-spacers and second sub-spacers. The main spacers are connected to the non-sensing area. The sensing protrusions are corresponding to the sensing area and respectively have a second electrode. A sensing gap exists between each second electrode and the corresponding first electrode. The first sub-spacers are corresponding to the non-sensing area and respectively keep a first sub-spacer gap from the first substrate. The second sub-spacers are corresponding to the non-sensing area and respectively keep a second sub-spacer gap from the first substrate. The sensing gap is greater than the first sub-spacer gap and less than the second sub-spacer gap.

24 Claims, 6 Drawing Sheets

TOUCH DISPLAY PANEL

CROSS-REFERENCE TO RELATED APPLICATION

This application claims the priority benefit of Taiwan application serial no. 97142206, filed Oct. 31, 2008. The entirety of the above-mentioned patent application is hereby incorporated by reference herein and made a part of this specification.

BACKGROUND OF THE INVENTION

1. Field of the Invention

The present invention generally relates to a touch display panel, and more particularly, to a built-in touch display panel.

2. Description of Related Art

In recent years, along with the rapid developments of the various applications of information technology, wireless mobile phones and information household appliances, to achieve the goals of more convenient usage, more compact design and more humanized features, many information products have changed their input devices from traditional keyboard or mouse to touch display panel.

FIG. 1 is a sectional view diagram of a conventional touch display panel. Referring to FIG. 1, a conventional touch display panel 100 includes a first substrate 110, a second substrate 120 and a liquid crystal layer 130. The second substrate 120 has a plurality of main spacers 128a, a plurality of sensing protrusions 128b, a plurality of sub-spacers 128c and a plurality of second electrodes 126, all of which are disposed thereon. The first substrate 110 has a plurality of padding structures for sensing 114b thereon. Each of the padding structures for sensing 114b has a first electrode 116 thereon. The main spacer 128a is disposed mainly for keeping a certain cell gap between the second substrate 120 and the first substrate 110. The sub-spacer 128c is for assisting support and avoiding the damages of the main spacer 128a and the sensing protrusion 128b caused by excessive deformations when an external force is applied onto the touch display panel and the external force is far greater than the endured load of the main spacer 128a and the sensing protrusion 128b.

Normally, the first electrode 116 on the padding structure for sensing 114b and the second electrode 126 on the sensing protrusion 128b do not directly contact each other and are spaced from each other by a sensing gap Gs. When an external force is applied onto the second substrate 120 to make the deformation of the main spacer 128a greater than the sensing gap Gs, the first electrode 116 and the second electrode 126 which normally do not directly contact each other would be electrically connected to each other, so that a voltage variation on the first substrate 110 is present. The position of the pressing point can be obtained by detecting the above-mentioned voltage variation, converting the voltage variation into a signal by the system and further calculating the corresponding coordinates.

However, the prior art has following disadvantages. First, after pressing the touch display panel many times, the main spacer 128a and the sensing protrusion 128b may produce permanent deformations and the elastic restoring functions thereof get poor, which reduces and even eliminates the sensing gap Gs. Under the situation, the first electrodes 116 and the second electrodes 126 at some points directly contact each other, which is accompanied with poor touch function or touch function short, even damages the second electrode 126 over the sensing protrusion 128b.

In order to increase the press-resistant performance and the lifetime of the touch display panel 100, main spacers 128a are deployed, but the scheme results in an increasing active force of touch leading to reducing the sensitivity of triggering touch inducting. On the other hand, the above-mentioned scheme likely produces low-temperature liquid crystal cells as well. So-called low-temperature liquid crystal cells are a sort of interspaces easily observed by a user through the display panel. Since the main spacer 128a and the liquid crystal layer 130 respectively have a different coefficient of thermal expansion (CTE), so that the two volumes of the main spacer 128a and the liquid crystal layer 130 are unable to be contracted in a same rate under a low temperature circumstance. As a result, the above-mentioned interspaces are produced in the liquid crystal layer 130 where the layer is supposed to be filled with liquid crystal molecules.

Second, since the main spacer 128a always contacts the first substrate 110 thereunder, the pixel electrode under the main spacer 128a must be spaced from the main spacer 128a by a distance to avoid a fault electrical connection between the second electrode 126 on the second substrate 120 and the pixel electrode to produce abnormal displaying due to an alignment error of assembling or a displacement of the main spacer 128a during pressing. In short, the conventional design would decrease the aperture ratio of the panel itself and thereby lower the transmittance or increase the cost of the backlight module.

Moreover, the second electrode 126 on the sensing protrusion 128b must contact the first electrode 116 on the padding structure for sensing 114b so as to change the potential of the first electrode 116 and thereby obtain the touch position, therefore, the thickness of the alignment film over the first electrodes would affect the active force of triggering touch inducting. In the prior art, the padding structure for sensing 114b is always formed by the combination of the stacking layers in the thin film transistor process (TFT process), therefore, the height of the padding structure for sensing 114b is unable to be effectively increased. When the alignment film is transfer-printed onto the first substrate 110 by using anastatic printing (APR) process, the thickness of the remained alignment film trace over the padding layer for sensing 114b can not be reduced with a height difference, which affects the uniformity and the active force of triggering touch inducting.

From the above described, it can be seen that how to overcome and prevent the above-mentioned shortages are considered as a significant project to be solved in the present production of touch display panels.

SUMMARY OF THE INVENTION

Accordingly, the present invention is directed to a touch display panel with stronger support thereof, increasing press-resistant capability and longer lifetime, meanwhile keeping the current inducting sensitivity of the touch panel itself.

The present invention is also directed to a touch display panel able to eliminate abnormal displaying produced by the panel and effectively increase the aperture ratio thereof.

The present invention is further directed to a touch display panel, wherein the desired gaps between the spacers and the padding structures can be realized by using a plurality of processes and different combinations of the heights so that the provided design has more flexibility and versatility.

The present invention provides a touch display panel, which includes a first substrate, a second substrate and a liquid crystal layer. The second substrate herein is disposed oppositely to the first substrate and the liquid crystal layer is disposed between the first substrate and the second substrate.

The first substrate includes a plurality of sensing areas and a non-sensing area outside the sensing areas, and there is a first electrode within each of the sensing areas. The second substrate is located at a surface of the first substrate with the sensing areas. A plurality of main spacers, a plurality of sensing protrusions, a plurality of first sub-spacers and a plurality of second sub-spacers are disposed at a surface of the second substrate facing the first substrate. The main spacers are connected to the non-sensing area of the first substrate. The sensing protrusions are respectively corresponding to the sensing areas of the first substrate and respectively have a second electrode, and there is a sensing gap between the first electrode and the second electrode at the position of each of the sensing protrusions. The first sub-spacers are located correspondingly to the non-sensing area of the first substrate, and at the position of each of the first sub-spacers there is a first sub-spacer gap between the first substrate and the second substrate. The second sub-spacers are located correspondingly to the non-sensing area of the first substrate, and at the position of each of the second sub-spacers there is a second sub-spacer gap between the first substrate and the second substrate. The first sub-spacer gap is less than the sensing gap and the sensing gap is less than the second sub-spacer gap.

In an embodiment of the present invention, the above-mentioned first electrode includes a sensing electrode.

In an embodiment of the present invention, the above-mentioned second electrodes are formed by a common electrode and the common electrode covers the above-mentioned sensing protrusions.

In an embodiment of the present invention, the above-mentioned common electrode covers at least one of the main spacer, the first sub-spacer and the second sub-spacer.

In an embodiment of the present invention, the above-mentioned main spacer, first sub-spacer or second sub-spacer covered by the common electrode have the height identical to the height of the sensing protrusion.

In an embodiment of the present invention, at least one of the above-mentioned main spacer, first sub-spacer and second sub-spacer is located on the above-mentioned common electrode.

In an embodiment of the present invention, the above-mentioned main spacer, first sub-spacer or second sub-spacer covered located on the common electrode have a height different from the height of the sensing protrusion.

In an embodiment of the present invention, the above-mentioned main spacer, first sub-spacer or second sub-spacer located on the common electrode respectively include prism-shaped spacer or ball-shaped spacer.

In an embodiment of the present invention, the above-mentioned main spacer, first sub-spacer or second sub-spacer located on the common electrode are ball-shaped spacer, the second substrate has a plurality of dents thereon at the positions corresponding to the ball-shaped spacers and the ball-shaped spacers are embedded into the dents.

In an embodiment of the present invention, the above-mentioned second substrate further includes a color filter layer located under the common electrode layer.

In an embodiment of the present invention, the above-mentioned second substrate further includes a black matrix located under the common electrode layer.

In an embodiment of the present invention, at least a set of the above-mentioned sensing protrusions, main spacers, first sub-spacers and second sub-spacers is located on the black matrix.

In an embodiment of the present invention, the above-mentioned first substrate includes a plurality of padding structures for sensing, a plurality of main padding structures, a plurality of first sub-padding structures and a plurality of second sub-padding structures. Each of the padding structures for sensing is located under the first electrode within a corresponding sensing area and is corresponding to a sensing protrusion. The main padding structures are located within the non-sensing area and respectively connected to the corresponding main spacer. The first sub-padding structures are located within the non-sensing area and corresponding to the first sub-spacers. The second sub-padding structures are located within the non-sensing area and corresponding to the corresponding second sub-spacers.

In an embodiment of the present invention, among the above-mentioned padding structures for sensing, main padding structures, first sub-padding structures and second sub-padding structures, the thickness of the main padding structure is greater than the thickness of the first sub-padding structure, the thickness of the first sub-padding structure is greater than the thickness of the padding structure for sensing and the thickness of the padding structure for sensing is greater than the thickness of the second sub-padding structure.

In an embodiment of the present invention, the ratio of the distribution density of the above-mentioned first sub-spacers on the second substrate over the distribution density of the main spacers on the second substrate ranges between 1 and 100.

In an embodiment of the present invention, the ratio of the distribution density of the above-mentioned first sub-spacers on the second substrate over the distribution density of the main spacers on the second substrate ranges between 5 and 15.

The present invention also provides a touch display panel, which includes a first substrate, a second substrate, a plurality of main supporting structures, a plurality of sensing structures, a plurality of first sub-supporting structures, a plurality of second sub-supporting structure and a liquid crystal layer. The second substrate herein is disposed oppositely to the first substrate and the liquid crystal layer is disposed between the first substrate and the second substrate. The first substrate includes a plurality of sensing areas and a non-sensing area outside the sensing areas, and there is a first electrode within each of the sensing areas. The second substrate is located at a surface of the first substrate with the sensing areas. The main supporting structures are disposed within the non-sensing area and connected to the first substrate and the second substrate. The sensing structures are disposed between the first substrate and the second substrate within the corresponding sensing areas. Each of the sensing structures includes a first electrode disposed at the surface of the first substrate and a second electrode disposed at a surface of the second substrate, and there is a sensing gap between the first electrode and the second electrode. The first sub-supporting structures are disposed between the first substrate and the second substrate within the non-sensing area and respectively have a first sub-spacer gap. The second sub-supporting structures are disposed between the first substrate and the second substrate within the non-sensing area and respectively have a second sub-spacer gap. The first sub-spacer gap is less than the sensing gap and the sensing gap is less than the second sub-spacer gap.

In an embodiment of the present invention, the above-mentioned first electrode includes a sensing electrode.

In an embodiment of the present invention, the above-mentioned second electrodes are formed by a common electrode.

In an embodiment of the present invention, the above-mentioned main supporting structure includes a main spacer located at the surface of the first substrate and a main padding structure located at the surface of the second substrate, and the main spacer is connected to the main padding structure.

In an embodiment of the present invention, the above-mentioned first sub-supporting structure includes a first sub-spacer located at the surface of the first substrate and a first sub-padding structure located at the surface of the second substrate, and there is a first sub-spacer gap between the first sub-spacer and the first sub-padding structure.

In an embodiment of the present invention, each of the above-mentioned sensing structures includes a sensing protrusion disposed between the first electrode and the first substrate and a padding structure for sensing disposed between the second electrode and the second substrate.

In an embodiment of the present invention, the above-mentioned second sub-supporting structure includes a second sub-spacer located at the surface of the first substrate and a second sub-padding structure located at the surface of the second substrate, and there is a second sub-spacer gap between the second sub-spacer and the second sub-padding structure.

The present invention deploys sub-spacers for enhancing the supporting strength of the touch display panel, increasing press-resistant capability and longer lifetime and reducing poor touch function and touch function short. Since the above-mentioned goals are achieved without increasing the main supporting spacers, so that the touch display panel provided by the present invention still keeps the inducting sensitivity of the touch panel itself and does not increase the risk chance of producing low-temperature liquid crystal cells.

In addition, the present invention can adopts a plurality of spacer processes, therefore, the desired gapes between the spaces and the padding structures can be realized not only by the variation of elevations formed through the TFT process on the first substrate, but also by changing the heights of the spacers themselves. In this way, the design of the present invention has more flexibility and versatility and is able to effectively reduce the thickness of the alignment film on the sensing pads of the first substrate and increase the sensitivity triggering touch function and overall uniformity of the touch display panel itself.

Moreover, the spacer processes used by the present invention can selectively fabricate the main spacers or other sub-spacers without second electrode thereon, which can eliminate the abnormal displaying caused by fault electrical connection between the second electrodes and the first electrodes under the second electrodes during pressing the touch display panel where a displacement or a dislocation of assembling may occur. Since the present invention owns the above-mentioned advantage, in order to prevent the dislocation of assembling, there is no need to largely increase the distances between the electrodes within the pixel regions and the main spacers in advance during designing the layout of the first substrate, which, in return, effectively increases the aperture ratio.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
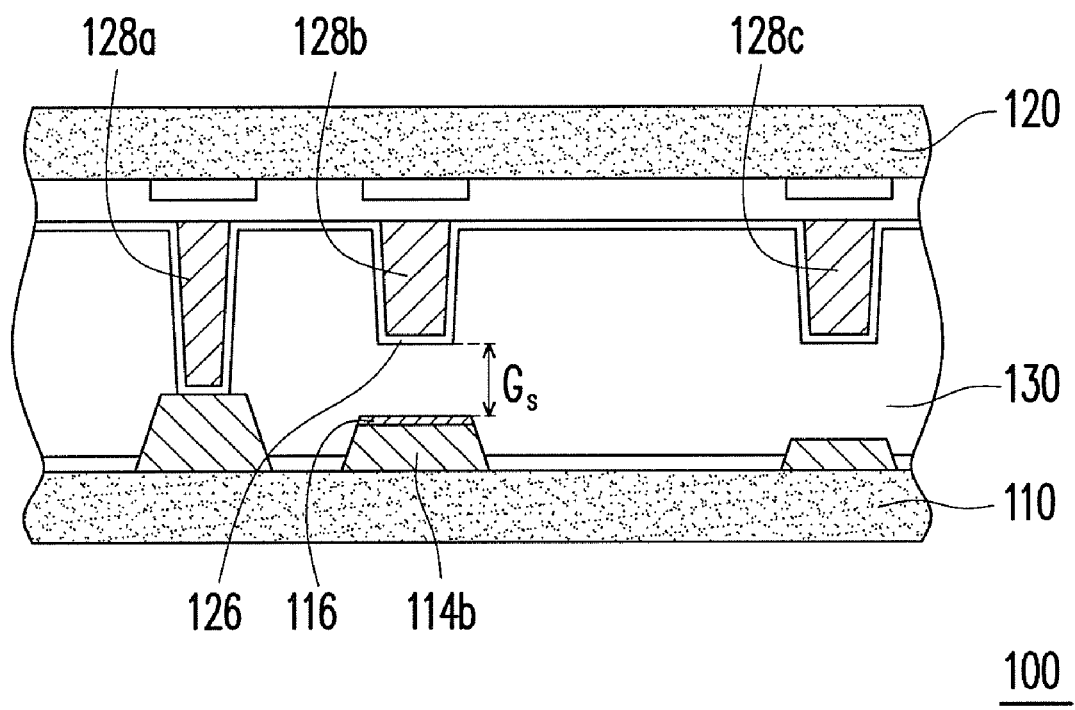
FIG. 1 is a sectional view diagram of a conventional touch display panel.

Reference will now be made in detail to the present preferred embodiments of the invention, examples of which are illustrated in the accompanying drawings. It should be noted that the details of the structures hereinafter provided in the embodiments can be used in combinations or replacements with each other, even be partially omitted according to the application practice. It will be apparent to those skilled in the art that various modifications and variations can be made to the structure of the present invention without departing from the scope or spirit of the invention. In addition, wherever possible, the same reference numbers are used in the drawings and the description to refer to the same or like parts.

Figure 2A:
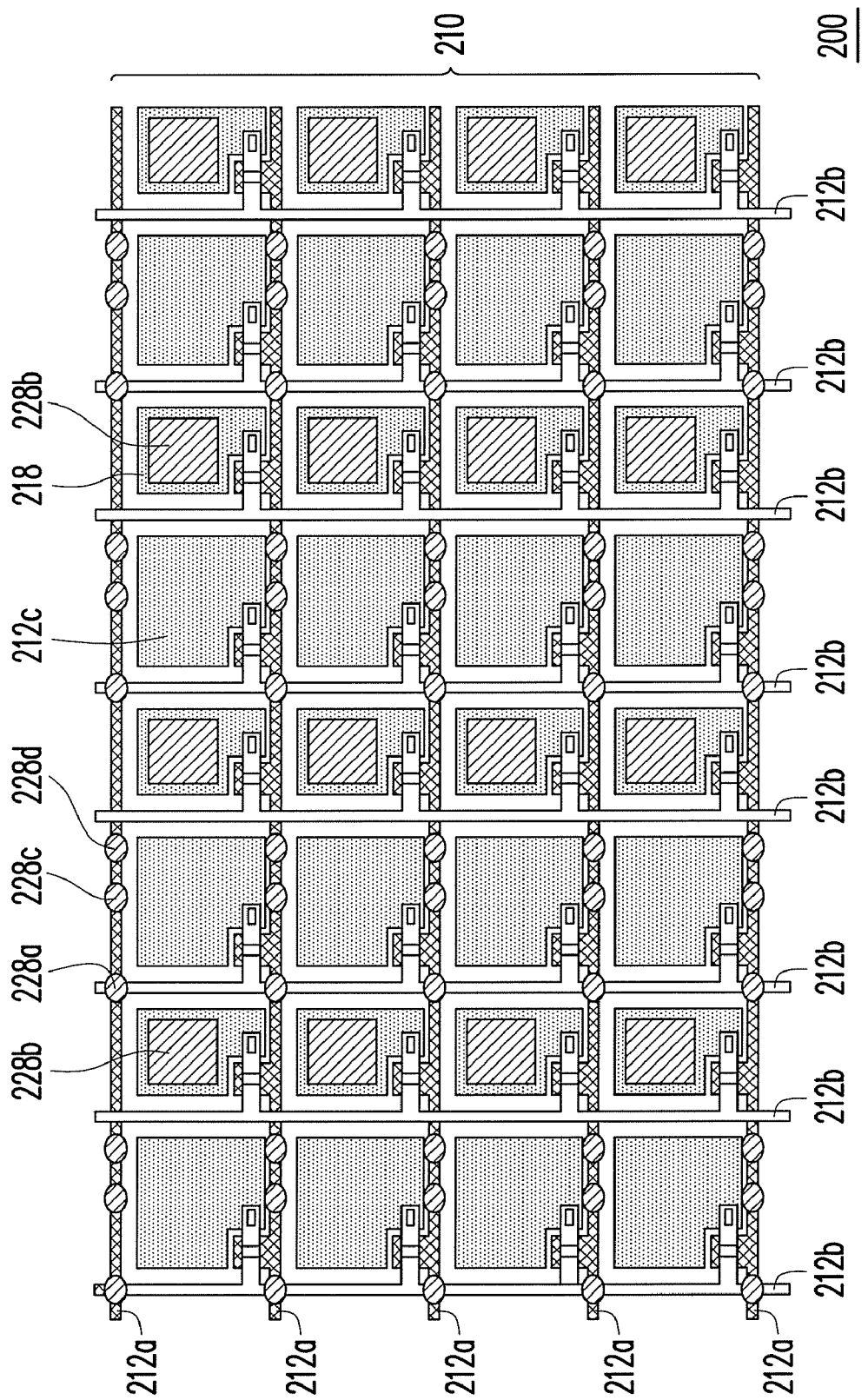
FIGS. 2A-2B are sectional view diagrams of a touch display panel according to an embodiment of the present invention.
Figure 2B:
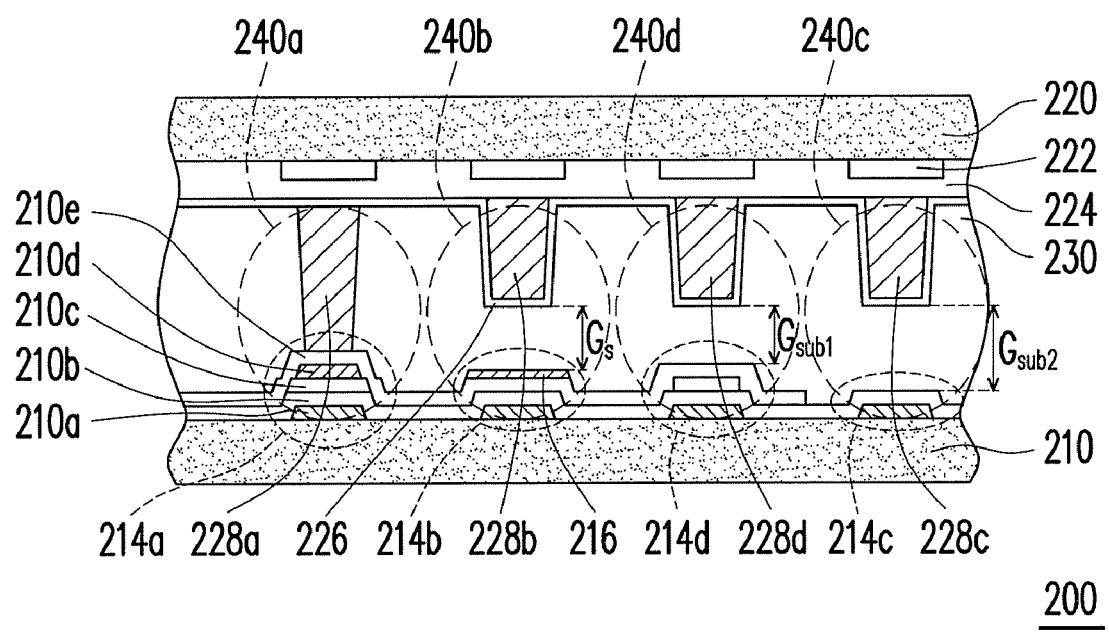

FIGS. 2A-2B are sectional view diagrams of a touch display panel according to an embodiment of the present invention. Referring to FIG. 2B, a touch display panel 200 includes a first substrate 210, a second substrate 220 and a liquid crystal layer 230. The first substrate 210 and the second substrate 220 are disposed oppositely to each other and the liquid crystal layer 230 is disposed between the first substrate 210 and the second substrate 220. Although the present invention exemplarily targets a touch-type LCD panel herein, but the present invention does not limit that. In fact, the touch display panel of the present invention can also be a touch-type organic electro-luminescent (OEL) display panel as well, and the liquid crystal layer 230 is replaced by an organic electro-luminescent material layer.

In the embodiment, the first substrate 210 is, for example, a thin film transistor (TFT) array substrate or other active device array substrates. The second substrate 220 is, for example, a color filter substrate and includes a color filter layer 224 and a black matrix 222. The present invention does not limit the types of the first substrate 210 and the second substrate 220. In other embodiments, for example, the first substrate 210 can be a COA substrate (color filter on array substrate, where a color filter is directly spread on a TFT array substrate) or an AOC substrate (TFT array on color filter substrate, where a TFT array is directly fabricated on a color filter substrate), and the second substrate 220 is an opposite substrate.

Continuing to FIG. 2A, the first substrate 210 of the touch display panel 200 has a plurality of sensing areas 218 and a non-sensing area located outside the sensing areas 218, wherein the non-sensing area can be, but not limited to, a non-displaying area between displaying blocks or inside the displaying area. The non-sensing area includes a plurality of pixel regions 212c, and each of the pixel regions 212c and each of the sensing areas 218 are respectively enclosed by two adjacent scan lines 212a and two adjacent data lines 212b.

Continuing to FIG. 2B, in the embodiment, the touch display panel 200 further includes a plurality of main supporting structures 240a, a plurality of sensing structures 240b, a plurality of first sub-supporting structures 240d and a plurality of second sub-supporting structures 240c.

The main supporting structures 240a herein are disposed within the non-sensing area and connected to the first substrate 210 and the second substrate 220. The sensing structures 240b are disposed between the first substrate 210 and the second substrate 220 within the corresponding sensing areas 218. Each of the sensing structures 240b includes a first electrode 216 disposed at a surface of the first substrate 210 and a second electrode 226 disposed at a surface of the second substrate 220. There is a sensing gap Gs between the first electrode 216 and the second electrode 226. The first sub-supporting structures 240d are disposed between the first substrate 210 and the second substrate 220 corresponding to the non-sensing area and respectively have a first sub-spacer gap Gsub1. The second sub-supporting structures 240c are disposed between the first substrate 210 and the second substrate 220 corresponding to the non-sensing area and respectively have a second sub-spacer gap Gsub2. The first sub-spacer gap Gsub1 is less than the sensing gap Gs, and the sensing gap Gs is less than the second sub-spacer gap Gsub2. In other words, the sensing gap Gs is larger than the first sub-spacer gap Gsub1, and the sensing gap Gs is less than the second sub-spacer gap Gsub2.

In the embodiment, each of the main supporting structures 240a further includes a main spacer 228a on the second substrate 220; each of the sensing structures 240b further includes a sensing protrusion 228b on the second substrate 220; each of the second sub-supporting structures 240c further includes a second sub-spacer 228c on the second substrate 220; each of the first sub-supporting structures 240d further includes a first sub-spacer 228d on the second substrate 220.

It should be noted that, in the embodiment, the main spacers 228a, the sensing protrusions 228b, the second sub-spacers 228c or the first sub-spacers 228d can be disposed correspondingly to an opaque area on the touch display panel 200 so as to avoid reducing the aperture ratio.

In terms of the disposition relative to the second substrate 220, the main spacers 228a, the sensing protrusions 228b, the second sub-spacers 228c or the first sub-spacers 228d can be selectively fabricated, for example, over the black matrix 222 on the second substrate 220 or directly fabricated over the color filter layer 224 on the second substrate 220. In the embodiment, the main spacers 228a, the sensing protrusions 228b, the second sub-spacers 228c and the first sub-spacers 228d are located on the black matrix 222 of the second substrate 220.

In terms of the disposition relative to the first substrate 210, the main spacers 228a, the second sub-spacers 228c and the first sub-spacers 228d can be correspondingly disposed over the non-sensing area of the first substrate 210 and can further be selectively disposed over the scan lines 212a, the data lines 212b or other opaque areas. In the embodiment, the main spacers 228a, the second sub-spacers 228c and the first sub-spacers 228d are located over the scan lines 212a. In addition, the sensing protrusions 228b are disposed over the corresponding sensing areas 218 of the first substrate 210.

It should be noted that the main spacers 228a, the second sub-spacers 228c and the first sub-spacers 228d can be selectively disposed over- or under the second electrode 226. Referring to FIG. 2A, in the embodiment, the sensing protrusions 228b, the second sub-spacers 228c and the first sub-spacers 228d are fabricated in a same process so as to have the same height. After that, the second electrode 226 is fabricated so that the second electrode 226 covers the surfaces of the above-mentioned sensing protrusions 228b, second sub-spacers 228c and first sub-spacers 228d. In the end, the main spacers 228a are fabricated on the second substrate 220 by conducting another process. As a result, the second electrode 226 is located on the sensing protrusions 228b, the second sub-spacers 228c and the first sub-spacers 228d; the sensing protrusions 228b, the second sub-spacers 228c and the first sub-spacers 228d all have the same height; the main spacers 228a do not contain the second electrode 226 thereon.

In the embodiment, the main spacers 228a are selectively formed after forming the second electrode 226, so that the fabricated second electrode 226 is located under the main spacers 228a, which can avoid possible electrical connections between the second electrode 226 and the pixel electrodes after assembling the touch display panel 200. In other words, no specific design consideration is needed to purposely isolate the pixel electrodes from the second electrode 226, which contributes to increase the area of the pixel electrodes and the aperture ratio of the touch display panel 200. The present invention can also selectively specify the sequence of the processes that the second sub-spacers 228c and the first sub-spacers 228d are formed after forming the second electrode 226.

Taking the process sequence that forming the main spacers 228a, the second sub-spacers 228c and the first sub-spacers 228d after forming the second electrode 226 is advantageous in adjusting the heights of the main spacers 228a, the second sub-spacers 228c and the first sub-spacers 228d, and also in adopting different processes to respectively form the main spacers 228a, the second sub-spacers 228c and the first sub-spacers 228d to make the panel process and the structure design have more flexibility and versatility.

Referring to FIGS. 2A and 2B, in the embodiment, each of the main supporting structures 240a further includes a main padding structure 214a disposed on the first substrate 210. Each of the sensing structures 240b further includes a padding structure for sensing 214b on the first substrate 210. Each of the second sub-supporting structures 240c further includes a second sub-padding structure 214c disposed on the first substrate 210. Each of the first sub-supporting structures 240d further includes a first sub-padding structure 214d disposed on the first substrate 210.

The main padding structures 214a are corresponding and connected to the main spacers 228a on the second substrate 220. The padding structures for sensing 214b are respectively corresponding to the sensing protrusions 228b, and there is a sensing gap Gs between each of the padding structures for sensing 214b and the corresponding sensing protrusion 228b. The second sub-padding structures 214c are corresponding to the second sub-spacers 228c on the second substrate 220, and there is a second sub-spacer gap Gsub2 between each of the second sub-padding structures 214c and the corresponding second sub-spacers 228c. The first sub-padding structures 214d are corresponding to the first sub-spacers 228d on the second substrate 220, and there is a first sub-spacer gap Gsub1 between each of the first sub-padding structures 214d and the corresponding first sub-spacers 228d. The sensing gap Gs is greater than the first sub-spacer gap Gsub1 but less than the second sub-spacer gap Gsub2; that is, the second sub-spacer gap Gsub2 is greater than the sensing gap Gs and the sensing gap Gs is greater than the first sub-spacer gap Gsub1.

The heights of the main padding structure 214a, the padding structure for sensing 214b, the second sub-padding structure 214c and the first sub-padding structure 214d can have different designs by using permutations and combinations. Referring to FIG. 2B, in the embodiment, the thickness of the main padding structure 214a on the first substrate 210 is greater than the thickness of the padding structure for sensing 214b, the thickness of the main padding structure 214a is greater than the thickness of the first sub-padding structure 214d, the thickness of the first sub-padding structure 214d is greater than the thickness of the padding structure for sensing 214b, and the thickness of the padding structure for sensing 214b is greater than the thickness of the second sub-padding structure 214c. In another feasible design, the thickness of the main padding structure 214a, the padding structure for sensing 214b, the second sub-padding structure 214c and the first sub-padding structure 214d can be the same as each other or the ones by using other feasible combinations.

The heights of the main padding structure 214a, the padding structure for sensing 214b, the second sub-padding structure 214c and the first sub-padding structure 214d are formed by using the TFT metal stacking process of the first substrate 210. In the embodiment, the main padding structure 214a is formed by stacking a gate layer 210a, a gate insulation layer 210b, a semiconductor layer 210c, a source layer 210d and a protection layer 210e in a TFT process; the padding structure for sensing 214b is formed by stacking the gate layer 210a, the gate insulation layer 210b and the protection layer 210e; the first sub-padding structure 214d is formed by stacking the gate layer 210a, the gate insulation layer 210b, the semiconductor layer 210c and the protection layer 210e; the second sub-padding structure 214c is formed by stacking the gate layer 210a and the gate insulation layer 210b.

In an embodiment of the present invention, the sensing gap Gs, the first sub-spacer gap Gsub1 and the second sub-spacer gap Gsub2 respectively corresponding to the sensing structure 240b, the first sub-supporting structure 240d and the second sub-supporting structure 240c can be achieved through the variations of the elevations of the padding structure for sensing 214b, the first sub-padding structure 214d and the second sub-padding structure 214c all formed in the above-mentioned TFT metal stacking process of the first substrate 210. In addition, the above-mentioned sensing gap Gs, first sub-spacer gap Gsub1 and second sub-spacer gap Gsub2 can also be achieved through the variations of the elevations of the sensing protrusion 228b, the first sub-spacer 228d and the second sub-spacer 228c on the second substrate 220. Moreover, the relationships that the second sub-spacer gap Gsub2 is greater than the sensing gap Gs and the sensing gap Gs is greater than the first sub-spacer gap Gsub1 can be realized through the combinations of the above-mentioned parameters.

Since the spacers on the second substrate 220 can be formed by conducting different processes, and the main spacers 228a, second sub-spacers 228c and first sub-spacers 228d can be selectively covered or uncovered by the second electrode 226, so that the overall design of the present invention produces more flexibility and versatility.

Among all feasible embodiments, as shown in FIGS. 2A and 2B, the first electrode 216 may include a sensing electrode, the second electrode 226 may include a common electrode and the common electrode covers all the sensing protrusions 228b. The ratio of the distribution density of the first sub-spacers 228d over the distribution density of the main spacers 228a on the second substrate 220 ranges between 1 and 100; preferably, the ratio of the distribution density of the first sub-spacers 228d over the distribution density of the main spacers 228a on the second substrate 220 ranges between 5 and 15. In other words, the number of the first sub-spacers 228d is 5 to 15 times to the number of the main spacers 228a. The present invention increases press-resistant capability and longer lifetime of the main spacers 228a by properly disposed the number of the first sub-spacers 228d, so that the touch display panel provided by the present invention still keeps the inducting sensitivity of the touch panel itself and does not increase the risk chance of producing low-temperature liquid crystal cells.

FIGS. 3A-6 are sectional view diagrams of the touch display panel 200 of FIG. 2B respectively showing a feasible component structure and the implementation. The basic architectures and the operation principles herein are depicted referring FIG. 2B, wherein the common content is omitted for simplicity.

Figure 3A:
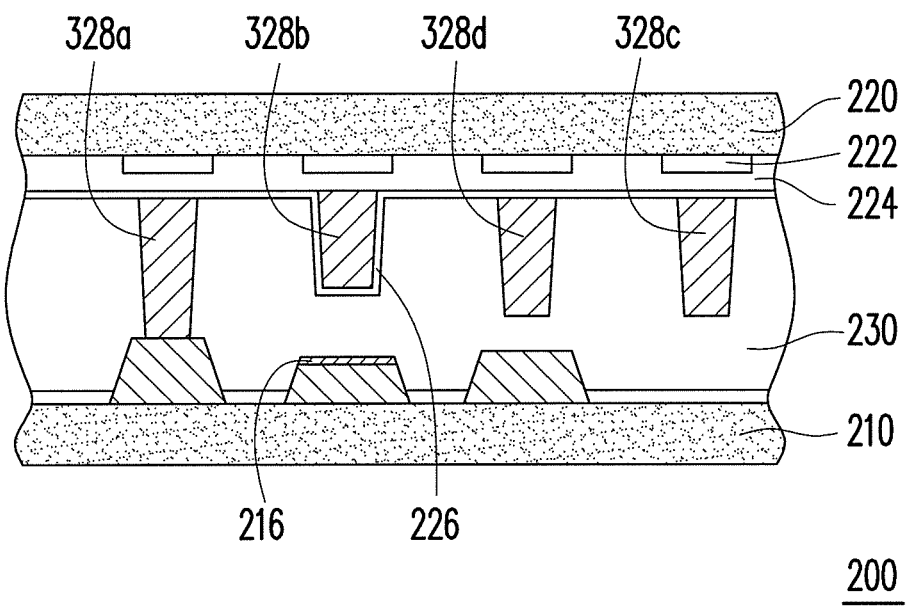
FIGS. 3A-3B are sectional view diagrams of a touch display panel according to an embodiment of the present invention.
Figure 3B:
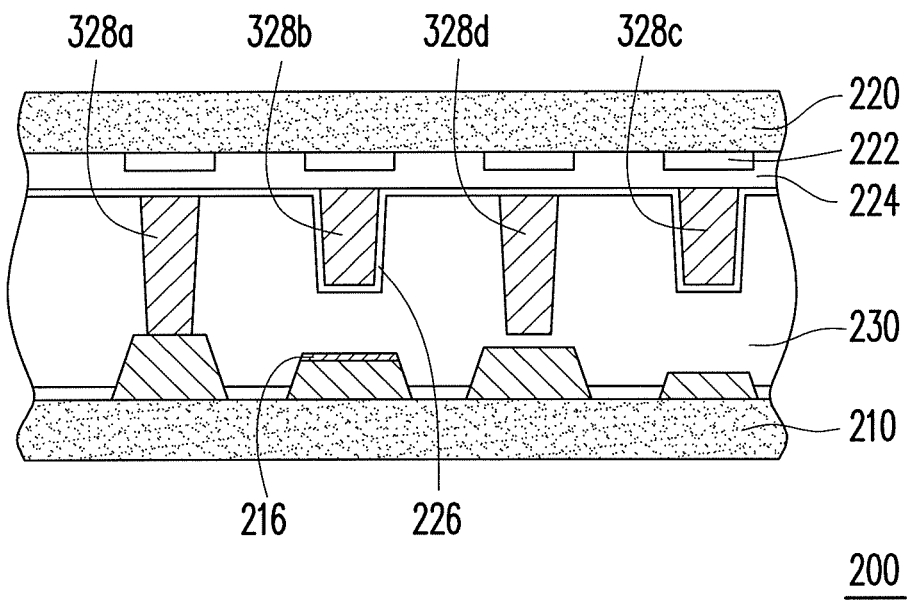

Referring to FIGS. 3A and 3B, in the touch display panel 200 of the embodiment, a second electrode 226 is disposed only on the surfaces of the sensing protrusions 328b, not on the surfaces of the main spacers 328a, second sub-spacers 328c and first sub-spacers 328d.

In the embodiment, the first electrode 216 may include a sensing electrode, the second electrode 226 may include a common electrode and the common electrode covers all the sensing protrusions 328b. The ratio of the distribution density of the first sub-spacers 328d over the distribution density of the main spacers 328a on the second substrate 220 ranges between 1 and 100; preferably, the ratio of the distribution density of the first sub-spacers 328d over the distribution density of the main spacers 328a on the second substrate 220 ranges between 3 and 50; more preferably, the ratio of the distribution density of the first sub-spacers 328d over the distribution density of the main spacers 328a on the second substrate 220 ranges between 5 and 15.

Referring to FIGS. 3B and 2B, in the touch display panel 200 of the embodiment, a second electrode 226 is disposed only on the surfaces of the sensing protrusions 328b and the second sub-spacers 328c, not on the surfaces of the main spacers 328a and first sub-spacers 328d.

In the embodiment, the first electrode 216 may include a sensing electrode, the second electrode 226 may include a common electrode and the common electrode covers all the sensing protrusions 328b. The ratio of the distribution density of the first sub-spacers 328d over the distribution density of the main spacers 328a on the second substrate 220 ranges between 1 and 100; preferably, the ratio of the distribution density of the first sub-spacers 328d over the distribution density of the main spacers 328a on the second substrate 220 ranges between 3 and 50; more preferably, the ratio of the distribution density of the first sub-spacers 328d over the distribution density of the main spacers 328a on the second substrate 220 ranges between 5 and 15.

Figure 4:
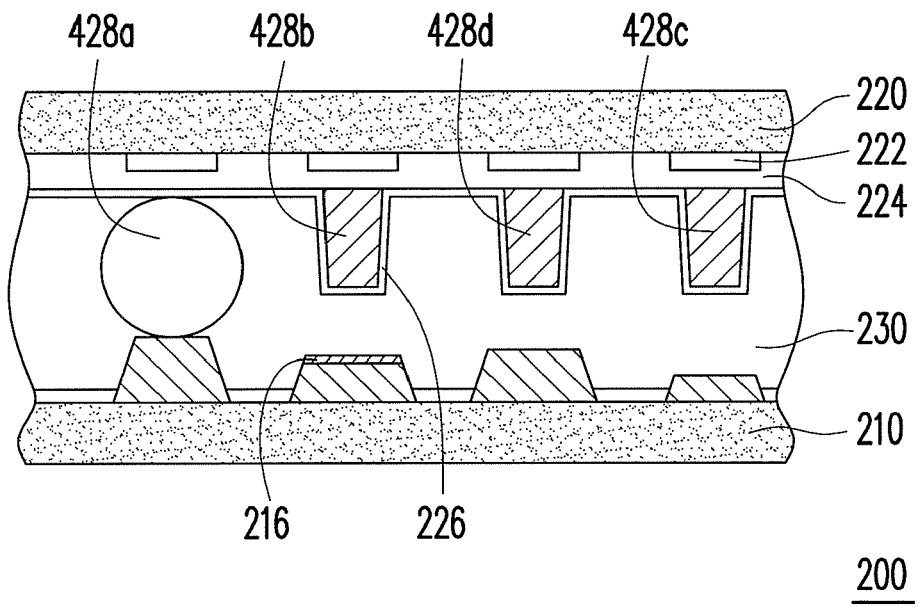
FIG. 4 is a sectional view diagram of a touch display panel according to an embodiment of the present invention.

Referring to FIGS. 4 and 2B, in the touch display panel 200 of the embodiment, a second electrode 226 is disposed only on the surfaces of the sensing protrusions 428b, the second sub-spacers 428c and the first sub-spacers 428d. After completing the second electrode 226, the main spacers 428a are fabricated by injecting ball spacers. Therefore, the main spacers 428a do not have the second electrode 226 thereon.

In the embodiment, the first electrode 216 may include a sensing electrode, the second electrode 226 may include a common electrode and the second electrode 226 covers all the sensing protrusions 428b. The ratio of the distribution density of the first sub-spacers 428d over the distribution density of the main spacers 428a on the second substrate 220 ranges between 1 and 100; preferably, the ratio of the distribution density of the first sub-spacers 428d over the distribution density of the main spacers 428a on the second substrate 220 ranges between 3 and 50; more preferably, the ratio of the distribution density of the first sub-spacers 428d over the distribution density of the main spacers 428a on the second substrate 220 ranges between 5 and 15.

Figure 5:
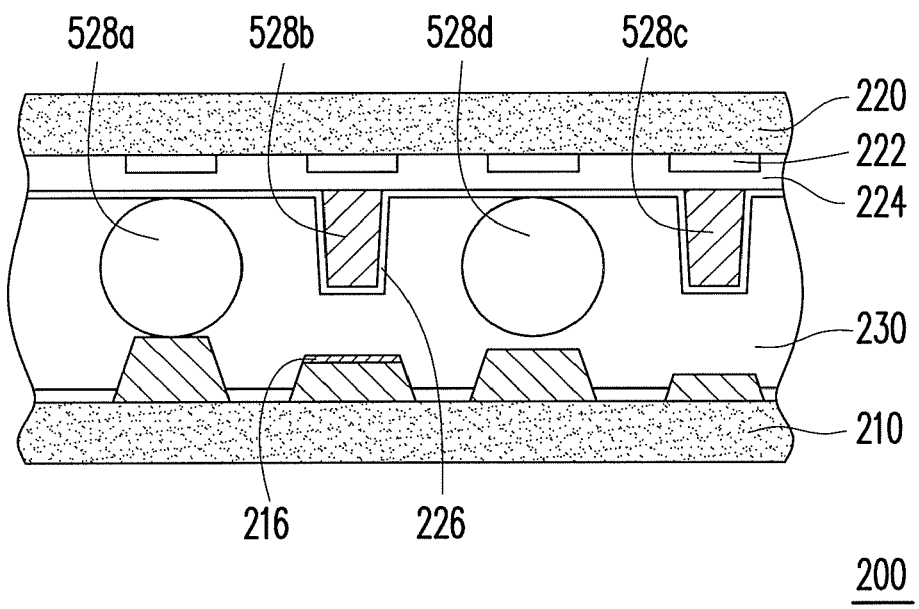
FIG. 5 is a sectional view diagram of a touch display panel according to an embodiment of the present invention.

Referring to FIGS. 5 and 2B, in the touch display panel 200 of the embodiment, a second electrode 226 is disposed only on the surfaces of the sensing protrusions 528b. After completing the second electrode 226, the second sub-spacers 528c are fabricated by using a TFT yellow light process, and the main spacers 528a and the first sub-spacers 528d are fabricated by injecting ball spacers. Therefore, the main spacers 528a, the first sub-spacers 528d and the second sub-spacers 528c do not have the second electrode 226 on the surfaces thereof.

In the embodiment, the first electrode 216 may include a sensing electrode, the second electrode 226 may include a common electrode and the second electrode 226 covers all the sensing protrusions 528b. The ratio of the distribution density of the first sub-spacers 528d over the distribution density of the main spacers 528a on the second substrate 220 ranges between 1 and 100; preferably, the ratio of the distribution density of the first sub-spacers 528d over the distribution density of the main spacers 528a on the second substrate 220 ranges between 3 and 50; more preferably, the ratio of the distribution density of the first sub-spacers 528d over the distribution density of the main spacers 528a on the second substrate 220 ranges between 5 and 15.

Figure 6:
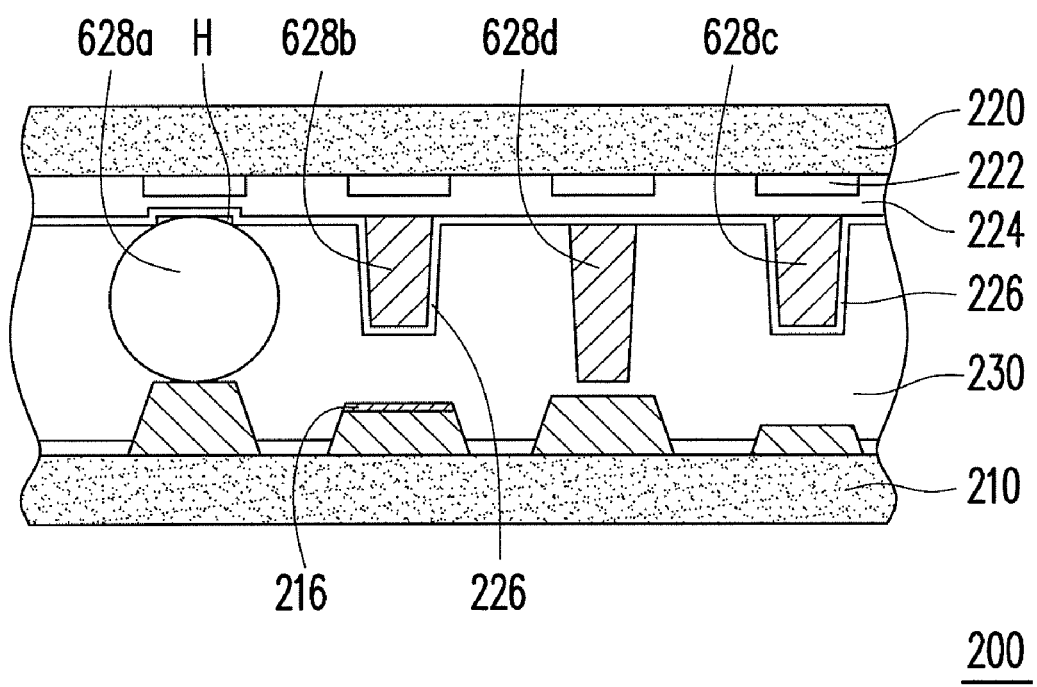
FIG. 6 is a sectional view diagram of a touch display panel according to an embodiment of the present invention.

Referring to FIGS. 6 and 2B, in the touch display panel 200 of the embodiment, a second electrode 226 is disposed only on the surfaces of the sensing protrusions 628b and the second sub-spacers 628c. After completing the second electrode 226, the first sub-spacers 628d are fabricated by a TFT yellow process and the main spacers 628a are fabricated by injecting ball spacers. Therefore, the main spacers 628a and the first sub-spacers 628d do not have the second electrode 226 on the surfaces thereof; in particular, the main spacers 628a are ball-shaped spacers. In the embodiment, a plurality of dents H are respectively disposed at the places on the second substrate 220 corresponding to the main spacers 628a so as to more conveniently embedding the main spacers 628a for fixing.

In the embodiment, the first electrode 216 may include a sensing electrode, and the second electrode 226 may include a common electrode and the second electrode 226 covers all the sensing protrusions 628b. The ratio of the distribution density of the first sub-spacers 628d over the distribution density of the main spacers 628a on the second substrate 220 ranges between 1 and 100; preferably, the ratio of the distribution density of the first sub-spacers 628d over the distribution density of the main spacers 628a on the second substrate 220 ranges between 5 and 15.

In addition to the above-mentioned modifications, the main spacers 628a, sensing protrusions 628b, first sub-spacers 628d and second sub-spacers 628c are allowed to be disposed on the first substrate 210 instead of the second substrate 220, but the above-mentioned relationships of the gaps of the present invention must be maintained.

In summary, the touch display panel of the present invention has at least following advantages. First, the touch display panel has additionally deployed first sub-spacers to increase the supporting capacity of the touch display panel and the press-resistant extent and lifetime thereof. Since there is no need to increase the number of the main spacers in comparison with the conventional touch display panel, the low-temperature liquid crystal cells produced under a low temperature environment can be reduced, and the original sensitivity triggering touch function can be maintained without increasing the required external touching force.

Next, in the present invention, the gaps between the spacers and the padding structures are maintained by conducting a plurality of spacer processes, wherein the mechanism of maintaining the gaps is achieved not only through the variation of elevations formed in the TFT yellow light processes on the first substrate, but also by changing the heights of the spacers on the second substrate. In this regard, the design of the present produces more flexibility and versatility.

Furthermore, the present invention adopts a process scheme that the main spacers or other sub-spacers are fabricated on the second substrate only after completing the second electrode on the second substrate. Consequently, the main spacers or the other sub-spacers can selectively have or have not the second electrode thereon, which can effectively eliminate the abnormal displaying caused by fault electrical connection between the second electrodes on the main spacers or the sub-spacers within the non-sensing area and the first electrodes under the second electrodes during pressing the touch display panel where a displacement of the main spacers or the sub-spacers or a dislocation of assembling may occur. Since the present invention owns the above-mentioned advantage, in order to prevent the dislocation of assembling, there is no need to largely increase the distances between the electrodes within the pixel regions and the main spacers in advance during designing the layout of the first substrate, which, in return, effectively increases the aperture ratio. Consequently, the present invention increases press-resistant capability and longer lifetime of the main supporting spacers, so that the touch display panel provided by the present invention still keeps the inducting sensitivity of the touch panel itself and does not increase the risk chance of producing low-temperature liquid crystal cells.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch display panel, comprising:
   a first substrate, comprising a plurality of sensing areas and a non-sensing area located outside the sensing areas, wherein the first substrate comprises a plurality of first electrodes respectively within each of the sensing areas;
   a second substrate, disposed oppositely to the first substrate, wherein the second substrate comprises:
      a plurality of main spacers, disposed at a surface of the second substrate facing the first substrate, wherein the main spacers are connected to the non-sensing area of the first substrate;
      a plurality of sensing protrusions, disposed at the surface of the second substrate facing the first substrate and respectively corresponding to the sensing areas of the first substrate, wherein each of the sensing protrusions has a second electrode disposed thereon and there is a sensing gap between the first electrode and the second electrode at each of the sensing protrusions;
      a plurality of first sub-spacers, disposed at the surface of the second substrate facing the first substrate and corresponding to the non-sensing area of the first substrate, wherein there is a first sub-spacer gap between the first substrate and each first sub-spacer of the second substrate; and
      a plurality of second sub-spacers, disposed at the surface of the second substrate facing the first substrate and corresponding to the non-sensing area of the first substrate, wherein there is a second sub-spacer gap between the first substrate and each second sub-spacer of the second substrate, and the first sub-spacer gap is less than the sensing gap and the sensing gap is less than the second sub-spacer gap; and a liquid crystal layer, disposed between the first substrate and the second substrate.

2. The touch display panel as claimed in claim 1, wherein the first electrode comprises a sensing electrode.

3. The touch display panel as claimed in claim 1, wherein the second electrodes are formed by a common electrode and the common electrode covers the sensing protrusions.

4. The touch display panel as claimed in claim 3, wherein at least a set of the main spacers, the first sub-spacers and the second sub-spacers is covered by the common electrode.

5. The touch display panel as claimed in claim 4, wherein the main spacers, the first sub-spacers or the second sub-spacers covered by the common electrode has the height identical to the height of the sensing protrusions.

6. The touch display panel as claimed in claim 3, wherein at least a set of the main spacers, the first sub-spacers and the second sub-spacers is located on the common electrode.

7. The touch display panel as claimed in claim 6, wherein the main spacers, the first sub-spacers or the second sub-spacers located on the common electrode has a height different from the height of the sensing protrusions.

8. The touch display panel as claimed in claim 6, wherein the main spacers, the first sub-spacers or the second sub-spacers located on the common electrode comprise prism-shaped spacer or ball-shaped spacer.

9. The touch display panel as claimed in claim 8, wherein the main spacers, the first sub-spacers or the second sub-spacers located on the common electrode are ball-shaped spacer, the second substrate has a plurality of dents thereon at the positions corresponding to the ball-shaped spacers and the ball-shaped spacers are embedded into the dents.

10. The touch display panel as claimed in claim 3, wherein the second substrate further comprises a color filter layer located under the common electrode layer.

11. The touch display panel as claimed in claim 10, wherein the second substrate further comprises a black matrix located under the common electrode layer.

12. The touch display panel as claimed in claim 11, wherein at least a set of the sensing protrusions, the main spacers, the first sub-spacers and the second sub-spacers is located on the black matrix.

13. The touch display panel as claimed in claim 1, wherein the first substrate comprises:

a plurality of padding structures for sensing, located under the first electrodes within the sensing area and corresponding to the sensing protrusions;

a plurality of main padding structures, located within the non-sensing area and respectively connected to the corresponding main spacer;

a plurality of first sub-padding structures, located within the non-sensing area and corresponding to the corresponding first sub-spacers; and a plurality of second sub-padding structures, located within the non-sensing area and corresponding to the corresponding second sub-spacers.

14. The touch display panel as claimed in claim 13, wherein among the padding structures for sensing, the main padding structures, the first sub-padding structures and the second sub-padding structures, the thickness of the main padding structures is greater than the thickness of the first sub-padding structures, the thickness of the first sub-padding structures is greater than the thickness of the padding structures for sensing and the thickness of the padding structures for sensing is greater than the thickness of the second sub-padding structures.

15. The touch display panel as claimed in claim 1, wherein the ratio of the distribution density of the first sub-spacers on the second substrate over the distribution density of the main spacers on the second substrate ranges between 1 and 100.

16. The touch display panel as claimed in claim 1, wherein the ratio of the distribution density of the first sub-spacers on the second substrate over the distribution density of the main spacers on the second substrate ranges between 5 and 15.

17. A touch display panel, comprising:

a first substrate, comprising a plurality of sensing areas and a non-sensing area outside the sensing areas, wherein the first substrate comprises a plurality of first electrodes respectively within each of the sensing areas;

a second substrate, disposed oppositely to the first substrate;

a plurality of main supporting structures, disposed within the non-sensing area and connected to the first substrate and the second substrate;

a plurality of sensing structures, disposed between the first substrate and the second substrate within the corresponding sensing areas, wherein each of the sensing structures comprises a first electrode disposed at a surface of the first substrate and a second electrode disposed at a surface of the second substrate, and there is a sensing gap between the first electrode and the second electrode;

a plurality of first sub-supporting structures, disposed between the first substrate and the second substrate within the non-sensing area and respectively having a first sub-spacer gap;

a plurality of second sub-supporting structure, disposed between the first substrate and the second substrate within the non-sensing area and respectively having a second sub-spacer gap, wherein the first sub-spacer gap is less than the sensing gap and the sensing gap is less than the second sub-spacer gap; and a liquid crystal layer, disposed between the first substrate and the second substrate.

18. The touch display panel as claimed in claim 17, wherein each first electrode comprises a sensing electrode.

19. The touch display panel as claimed in claim 17, wherein the second electrodes are formed by a common electrode.

20. The touch display panel as claimed in claim 17, wherein each main supporting structure comprises a main spacer located at the surface of the first substrate and a main padding structure located at the surface of the second substrate, and the main spacer is connected to the main padding structure.

21. The touch display panel as claimed in claim 17, wherein each first sub-supporting structure comprises a first sub-spacer located at the surface of the first substrate and a first sub-padding structure located at the surface of the second substrate, and there is a first sub-spacer gap between the first sub-spacer and the first sub-padding structure.

22. The touch display panel as claimed in claim 17, wherein each sensing structures comprises a sensing protrusion disposed between the corresponding first electrode and the first substrate and a padding structure for sensing disposed between the corresponding second electrode and the second substrate.

23. The touch display panel as claimed in claim 17, wherein each second sub-supporting structure comprises a second sub-spacer located at the surface of the first substrate and a second sub-padding structure located at the surface of the second substrate, and there is a second sub-spacer gap between the second sub-spacer and the second sub-padding structure.

24. A touch display panel, comprising:
a first substrate, comprising a plurality of sensing areas and a non-sensing area outside the sensing areas, wherein the first substrate comprises a plurality of first electrodes respectively within each of the sensing areas;
a second substrate, disposed oppositely to the first substrate;
a plurality of main supporting structures, disposed within the non-sensing area and connected to the first substrate and the second substrate;
a plurality of sensing structures, disposed between the first substrate and the second substrate within the corresponding sensing areas, wherein each of the sensing structures comprises a first electrode disposed at a surface of the first substrate and a second electrode disposed at a surface of the second substrate, and there is a sensing gap between the first electrode and the second electrode;
a plurality of first sub-supporting structures, disposed between the first substrate and the second substrate within the non-sensing area and respectively having a first sub-spacer gap; and
a plurality of second sub-supporting structure, disposed between the first substrate and the second substrate within the non-sensing area and respectively having a second sub-spacer gap, wherein the first sub-spacer gap is less than the sensing gap and the sensing gap is less than the second sub-spacer gap.

* * * * *